United States Patent [19]
Ueda et al.

[11] Patent Number: 5,812,825
[45] Date of Patent: Sep. 22, 1998

[54] INTEGRATED CONSOLE AND CONSOLE APPARATUS AND METHOD FOR USE THEREOF

[75] Inventors: Atsushi Ueda, Ome; Toshio Hirosawa, Machida; Tsutomu Ito, Tukui-gun; Motohide Kokunishi, Hachioji, all of Japan

[73] Assignee: Hitachi, Ltd., Tokyo, Japan

[21] Appl. No.: 698,458

[22] Filed: Aug. 15, 1996

[30] Foreign Application Priority Data

Aug. 17, 1995 [JP] Japan .................................. 7-232016

[51] Int. Cl.⁶ .................................................. G06F 15/16
[52] U.S. Cl. .................. 395/500; 395/200.3; 395/800.1; 395/825
[58] Field of Search ..................... 395/500, 701, 395/182.02, 182.03, 182.08, 182.09, 183.03, 183.04, 670, 672, 678, 683, 684, 800.1, 200.3, 200.34, 200.36, 821, 825, 831, 834

[56] References Cited

U.S. PATENT DOCUMENTS

| | | |
|---|---|---|
| 5,121,486 | 6/1992 | Kurlhara et al. |
| 5,321,816 | 6/1994 | Rogan et al. ............................ 395/200 |
| 5,604,863 | 2/1997 | Allen et al. ........................ 395/182.09 |
| 5,634,072 | 5/1997 | Allen et al. .............................. 395/674 |
| 5,646,871 | 7/1997 | Cadot ...................................... 364/579 |

*Primary Examiner*—Kevin J. Teska
*Assistant Examiner*—Thai Phan
*Attorney, Agent, or Firm*—Antonelli, Terry, Stout & Kraus, LLP

[57] ABSTRACT

An integrated console connected to a plurality of computer systems for sending a command entered from an input device to one of the computer systems which executes commands corresponding to the command from the input device and receiving signals that are output from the computer systems. The present invention includes a memory device which stores data used to select a destination of a command entered from the input device, and a control unit which analyzes the command entered from the input device and sends the command entered from the input device to a selected one of the computers which executes commands corresponding to the command entered from the input device based on the data stored in the memory device. The control unit includes a selector for selecting one of the computers based on the command input from the input device and the data stored in the memory device, and sending apparatus for sending the command input from the input device to the computer selected by the selector.

38 Claims, 9 Drawing Sheets

SYSTEM STRUCTURE RECORD 50

| RECORD ID 111 | DEVICE NAME 112 | CONNECTED CPU 113 | DEVICE ID 114 | OPERATION STATE 115 | SEND FLAG 116 | |
|---|---|---|---|---|---|---|
| 1 | PRINTER A | CPU-A | 0001 | 1 | 0 | ←50a |
| 1 | PRINTER B | CPU-n | 0002 | 0 | 0 | ←50b |
| 1 | PRINTER C | cpu-a | 0003 | 1 | 0 | ←50c |
| 2 | SPOOL A | CPU-A | 0004 | 1 | 0 | ←50d |
| 2 | SPOOL A | CPU-B | 0004 | 1 | 0 | ←50e |
| 2 | SPOOL A | CPU-n | 0004 | 0 | 0 | ←50f |
| 2 | SPOOL B | cpu-a | 0005 | 1 | 0 | ←50g |
| 2 | SPOOL B | cpu-b | 0005 | 1 | 0 | ←50h |
| 2 | SPOOL B | cpu-n | 0005 | 1 | 0 | ←50i |
| 3 | DISK | cpu-b | 0006 | 1 | 1 | ←50j |
| 3 | DISK | cpu-n | 0006 | 1 | 1 | ←50k |
| 4 | PRINTER-A | CPU-A | 0001 | 1 | 0 | ←50l |

FIG. 3

| COMMAND 121 | OPERAND 122 | ID OPERAND 123 | DISCRIMINATING ID RECORD 124 | COMMAND ID 125 | UNIFIED FLAG 126 | MESSAGE ANALYZE INFORMATION 127 |
|---|---|---|---|---|---|---|
| PRINTER ON-LINE | PRINTER NAME | PRINTER ID | 1 | NONE | 0 | NONE |
| PRINTER OUTPUT | JOB NAME PRINTER NAME | PRINTER ID | 4 | NONE | 0 | NONE |
| DISK ON-LINE | DISK NAME | PRINTER ID | 3 | NONE | 1 | NONE |
| JOB CANCEL | JOB NAME | NONE | 2 | JOB SEARCH | 0 | NONE |
| JOB SEARCH | JOB NAME | NONE | 2 | NONE | 0 | JOB NAME |

FIG. 4

UNIFIED COMMAND INFORMATION RECORD

| UNIFIED COMMAND | CPU COMMAND | RESPONDING CPU | |
|---|---|---|---|
| DISK ON-LINE | aaa | CPU-A | 161a |
| DISK ON-LINE | bbb | CPU-B | 161b |

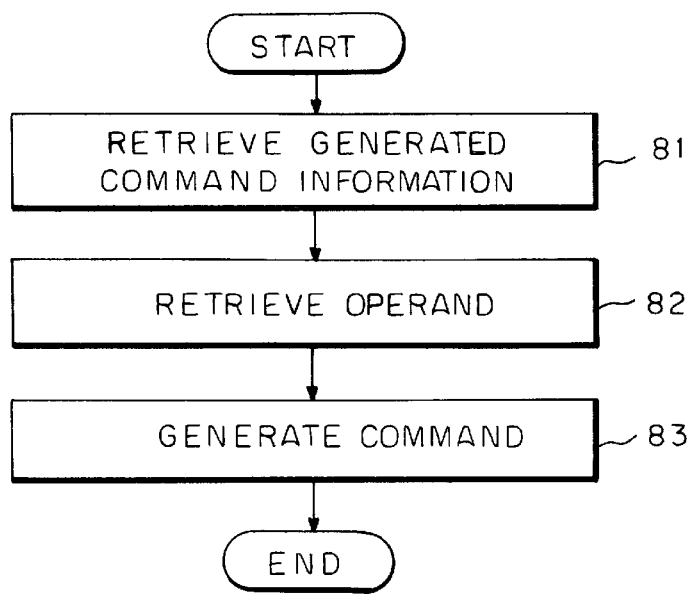
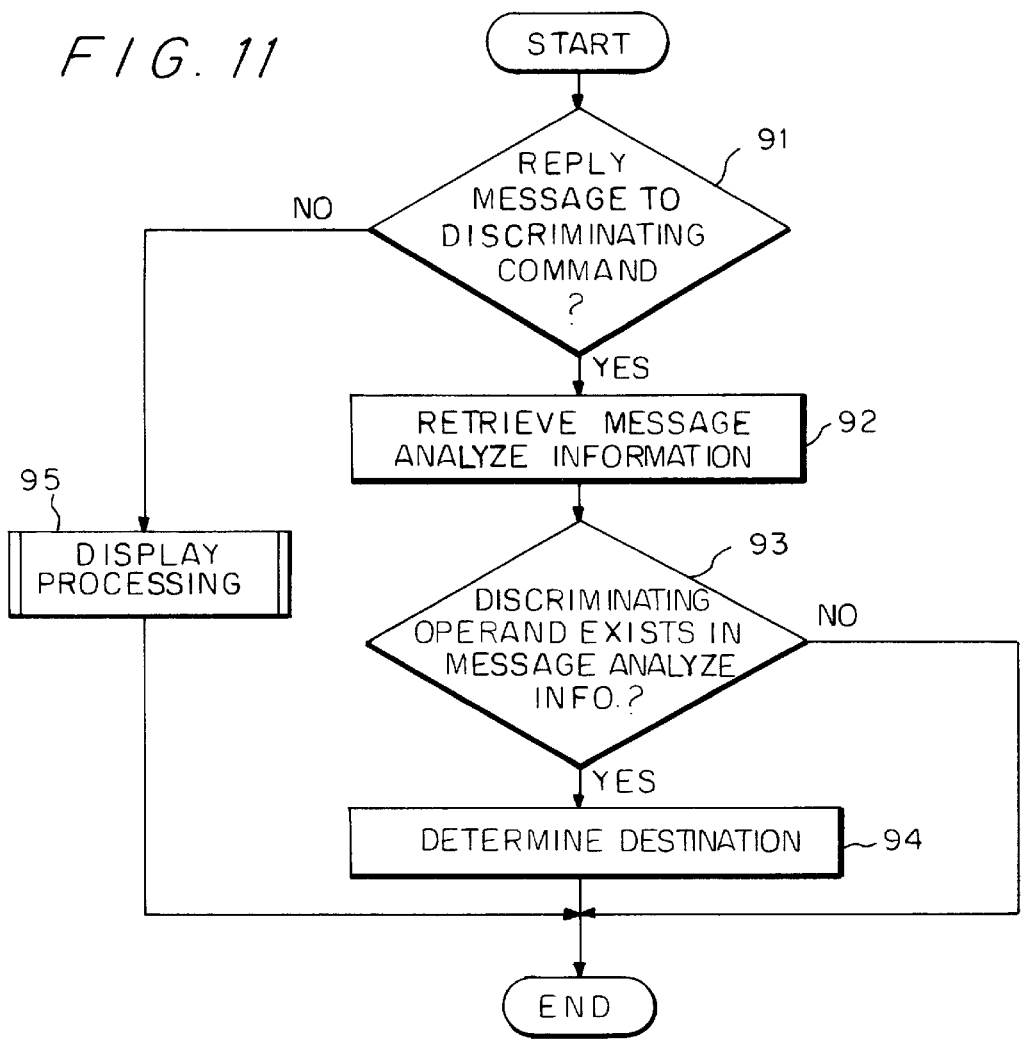

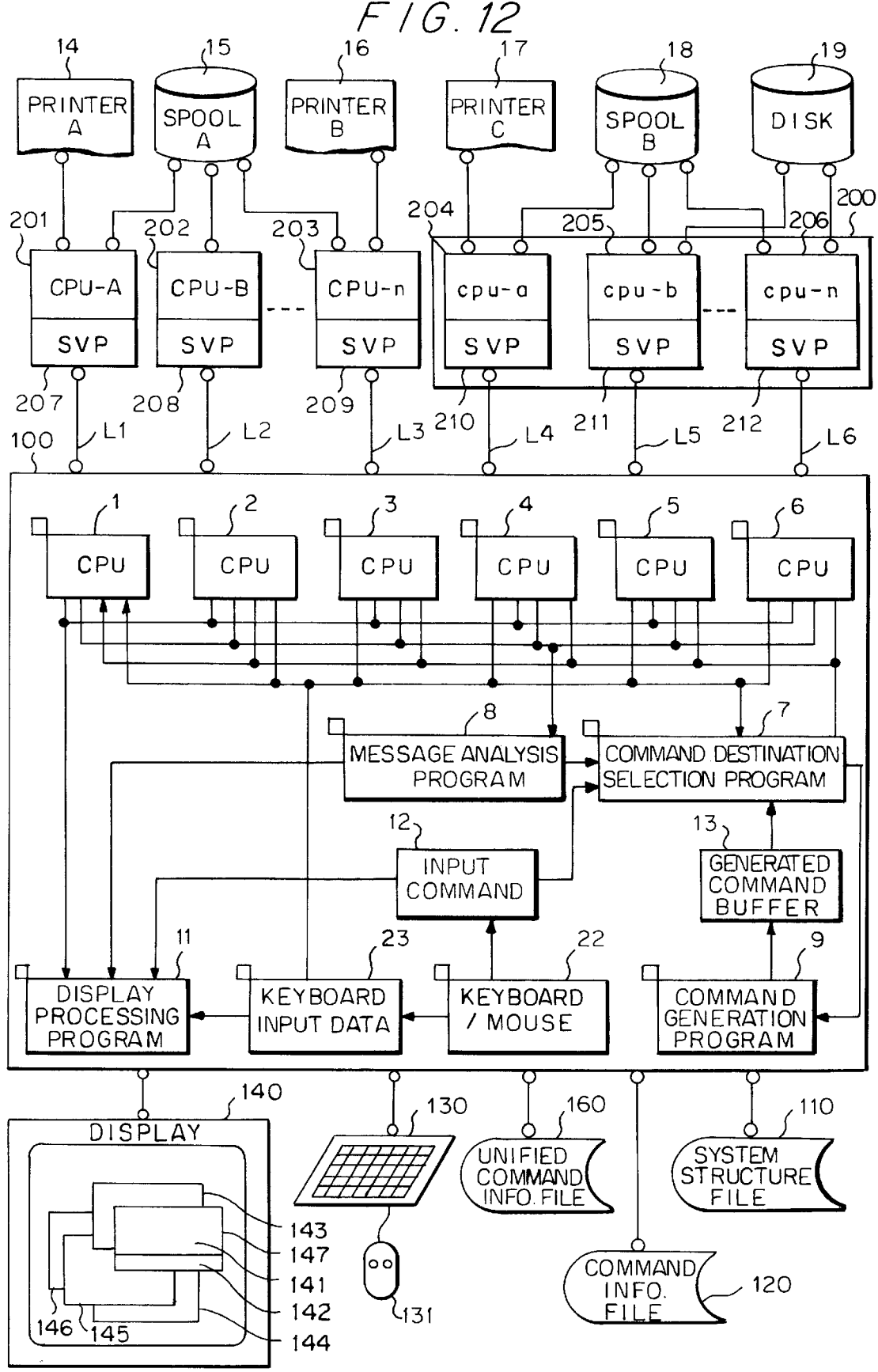

INTEGRATED CONSOLE AND CONSOLE APPARATUS AND METHOD FOR USE THEREOF

BACKGROUND OF THE INVENTION

The present invention relates to an integrated console which controls computer systems and a superparallel computer having a plurality of central processing units. More particularly, the present invention relates to an integrated console which selects a computer system, a central processing unit or a parallel/superparallel computer to which an input command is to be sent and then sends the input command to the selected computer system or central processing unit, wherein the computer system has one central processing unit and a parallel computer or superparallel computer has two or more central processing units and a method for use of the integrated console.

A computer system having a console that offers an interface between the computer system and an operator is known. Generally, for each central processing unit only one console is provided. In a parallel computer one console is generally provided for each of the central processing units of the parallel computer.

For improved reliability of the system, reduced labor in system operation, and prevention of erroneous operation on the part of the operator, a control method is disclosed in Japan Patent Laid-Open No. 96725/1989, which enables control of the central processing units of a plurality of computer systems with a single console.

The control method, by which the above-described conventional technology realizes control of a plurality of central processing units with one console, includes the steps of displaying windows for operating the central processing units physically on one display device of a single console, selecting a window corresponding to the central processing unit that the operator wishes to control, and performing control through the selected window.

Before the console operation can be performed, however, the working state of each central processing unit and system configuration, i.e., the states of jobs executed in each central processing unit, states of devices connected and their configurations, must be checked. Further, commands that cause the performance of the same function may differ from one central processing unit to another. Thus, the console operation should take into account the particular commands that can be entered into each of the central processing units.

With the above conventional method, in which windows to control multiple central processing units of computer systems and of a superparallel computer are displayed on a single console and an appropriate window is selected for console operation, the required procedure involves checking the working state of each central processing unit, the system configuration and the commands that can be entered, selecting a window corresponding to the desired central processing unit, and then performing the console operation. This sequence of operation may cause erroneous console operations.

SUMMARY OF THE INVENTION

The object of the present invention is to provide an integrated console which enables selection, with a single operation a display page on one console, a central processing unit that an operator wants to execute an input command.

To achieve the above objective, the integrated console of the present is an integrated console connected to a plurality of computer systems for sending and receiving commands and signals between the computer systems. More particularly, the integrated console of the present invention sends a command entered from an input device to one of the computer systems which executes commands corresponding to the command from the input device and receives signals that are output from the computer systems. A computer system can be a computer system having a single central processing unit or a parallel or superparallel computer having plural central processing units.

The integrated console of the present invention includes a memory device which stores data used to select a destination of a command entered from the input device, and a control unit which analyzes the command entered from the input device and sends the command entered from the input device to a selected one of the computers which executes commands corresponding to the command entered from the input device based on the data stored in the memory device. The control unit includes a selector for selecting one of the computers based on a command input from the input device and the data stored in the memory device, and sending apparatus for sending the command input from the input device to the computer selected by the selector.

The integrated console of the present invention can also be configured to include a control unit, a display, an input device operated by an operator, and a memory in which to store data used to select a destination of a command entered from the input device.

The integrated console of the present invention is connected to a plurality of computer systems and/or a superparallel computer. The integrated console sends a command entered from the input device to the central processing units of the computer systems and/or the central processing units in the superparallel computer corresponding to the command, and takes in signals that are output from the central processing units of the plurality of computer systems and/or the individual central processing units in the superparallel computer. The control unit analyzes the command entered from the input device according to the data stored in the memory. The control unit includes a selector and sending apparatus. The selector selects a central processing unit that should execute the command from among the central processing units of the plurality of the computer systems and/or the plurality of central processing units in the superparallel computer. The sending apparatus sends the command to the selected central processing unit selected by the selection means.

The integrated console of the present invention can further be configured to include an input/output device having a display and an input device operated by an operator, a central processing unit connected to the input/output device, and memory connected to the central processing unit for storing data used to select a destination of a command entered from the input/output device.

The integrated console of is connected to a plurality of computer systems and/or a superparallel computer. The integrated console sends a command entered from the input/output device to the central processing unit connected to the input/output device and to central processing units of the computer systems and/or central processing units in a superparallel computer that correspond to the command, and takes in signals output from the central processing unit connected to the input/output device, the central processing units of the computer systems and/or the individual central processing units in the superparallel computer. The central processing unit connected to the input/output device includes a selector and command sending apparatus. The selector analyzes the command entered from the input/output device according to data stored in the memory and selects central processing units to execute the command from among the central processing unit connected to the input/output device, the central processing units of the computer systems and/or central processing units in the superparallel computer. The command sending apparatus sends the command to the central processing units selected by the selector.

The integrated console of the present invention can still further be configured to include a control unit, a multi-window display to display a plurality of console screens, and an input device operated by an operator. The integrated console is connected to computer systems and/or a superparallel computer. When a window for a console screen is selected from the multi-windows by an input device and an input command is entered, the integrated console sends the input command to a central processing unit among central processing units of the computer systems and/or central processing units of the superparallel computer that correspond to the selected console screen. Further provided in the integrated console is a memory which stores data used to select a destination of the command entered from the input device.

The control unit is provided with an integrated console control unit which includes a selector and command sending apparatus. The selector analyzes a command entered from the input device according to the data stored in the memory and selects the central processing units that should execute the command from among central processing units of the computer systems and central processing units in the superparallel computer. When the input device selects a window for an integrated console screen and an input command is entered, the control unit sends the input command to the central processing units selected by the integrated console control unit.

The integrated console of the present invention allows for console operation without an operator having to be aware of the system configuration, the operation state of each central processing units and the commands executable by the central processing units. The information concerning system configuration, operation state of the central processing units and the commands executable by the central processing units becomes more complex as the number of the central processing units increase. The present invention avoids this problem.

The present invention also provides a method to be performed by a user in an integrated console connected to a plurality of computer systems for sending a command entered from an input device when manipulated by the user to one of the computer systems which executes commands corresponding to the command from the input device and receiving signals that are output from the computer systems. The method includes the steps of inputting a command from the input device being manipulated by the user, analyzing the command entered from the input device, sending the command entered from the input device being manipulated by the user to a selected one of the computer systems which executes commands corresponding to the command based on data stored in a memory device. The memory device stores data used to select a destination of a command entered from the input device.

BRIEF DESCRIPTION OF THE DRAWINGS

The present invention will be more apparent from the following detailed description, when taken in conjunction with the accompanying drawings, in which:

FIG. 3 illustrates an example format of a system structure record stored in a system structure file;

FIG. 4 illustrates an example format of a command information record stored in a command information file;

FIG. 10 is a flowchart illustrating a command generation program;

FIG. 11 is a flowchart illustrating a message analysis program; and

FIG. 12 is a block diagram illustrating the configuration of a computer system applying the console apparatus as a third embodiment of this invention.

DETAILED DESCRIPTION OF THE PREFERRED EMBODIMENTS

A first embodiment of the present invention is described by referring to FIGS. 1, 3–6 and 8–11.

Figure 1:
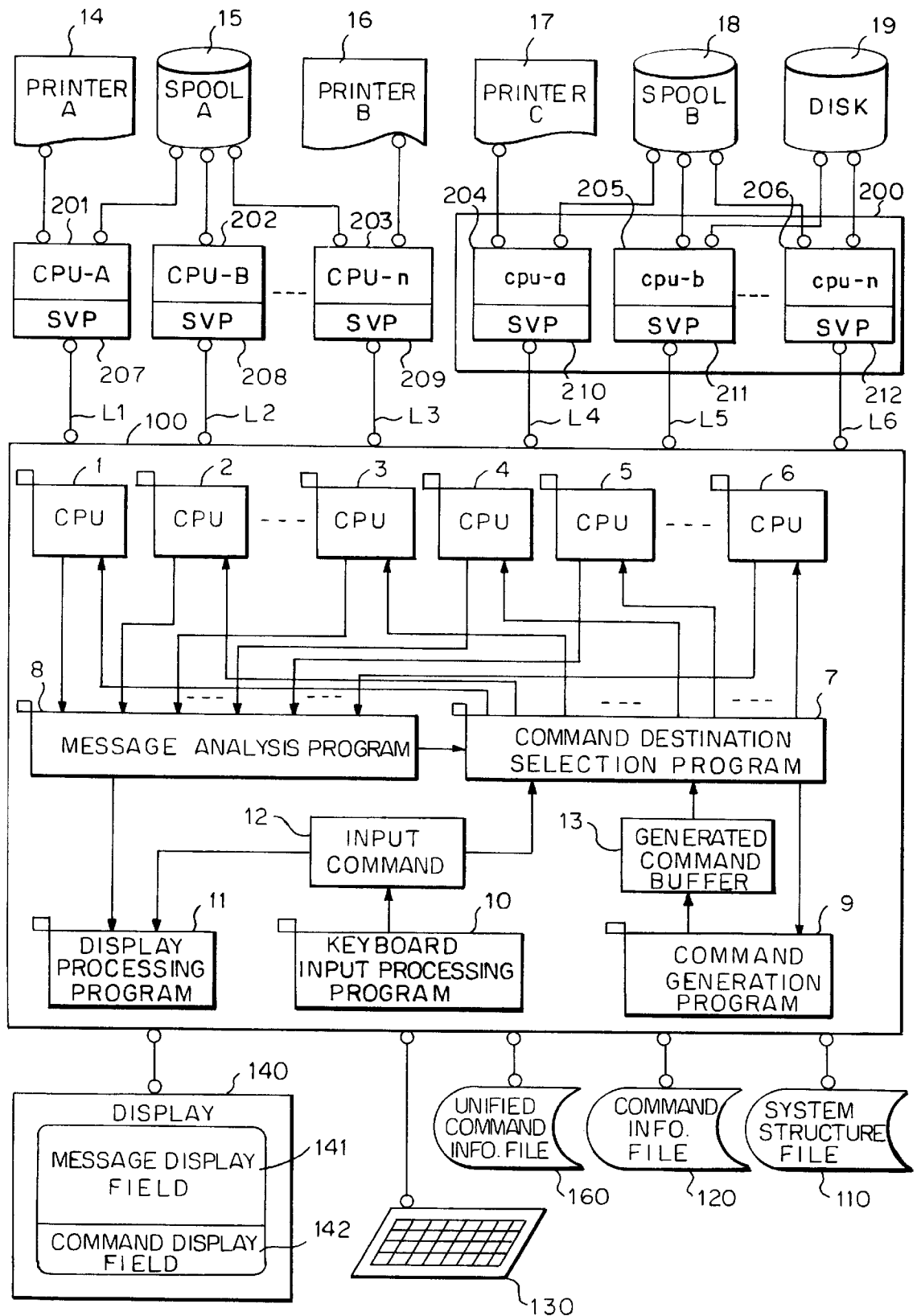
FIG. 1 is a block diagram showing the configuration of a computer system applying the integrated console as a first embodiment of this invention.

FIG. 1 is a block diagram illustrating the configuration of the computer systems that apply the integrated console of the present invention. FIG. 1 illustrates the configuration of a command destination selection control of the integrated console as realized by a personal computer or workstation.

In FIG. 1, reference numerals 201, 202 and 203 represent central processing units of computer systems designated CPU-A, CPU-B and CPUn, respectively. A superparallel computer 200 has central processing units (CPUs) 204, 205, 206 designated cpu-a, cpu-b and cpu-n, respectively. The CPUs 201, 202, 203, 204, 205, 206 run their own operating systems (OSs), under each of which application programs are run. The operating systems running in each of the CPUs 201, 202, 203, 204, 205, 206 may or may not be the same.

In FIG. 1, the above-mentioned operating systems and application programs are not shown. The CPUs 201, 202, 203, 204, 205, 206 have service processors (SVPs) 207, 208, 209, 210, 211, 212. The service processors SVP are logical control units for the central processing units and the console. The SVP is described in Japan Patent Laid-Open No. 81655/1982. The SVPs 207, 208, 209, 210, 211, 212 are connected to a control unit 100 through lines L1, L2, L3, L4, L5, L6.

The control unit 100 has a data processing capability and can be realized by a personal computer or a work station. Operating systems such as MS-DOS and UNIX may be used. In FIG. 1, these operating systems are not shown. The control unit 100 is connected with a system structure file 110, a command information file 120 storing console command information, a unified command information file 160 storing information on unified commands which have the same functions but whose command formats are different among the central processing units, a keyboard 130 and a display 140.

The integrated console comprises the control unit 100, the system structure file 110, the command information file 120, the unified command information file 160, the keyboard 130 and the display 140. The information contained in the system structure file 110, the command information file 120 and the unified command information file 160 may be stored in files or in memory in the control unit 100. Running in the control unit 100 of FIG. 1 are programs (command destination selection program 7, message analysis program 8 and command generation program 9) that realize the command destination selection control of the integrated console of this invention.

Communication processing units 1, 2, 3, 4, 5, 6 are programs that control through the lines L1, L2, L3, L4, L5, L6 communication of console messages and console commands to the SVPs 207, 208, 209, 210, 211, 212 of the CPUs 201, 202, 203, 204, 205, 206. For example, the communication processing unit 1 corresponds to the CPU 201, the communication processing unit 2 to the CPU 202, the communication processing unit 3 to the CPU 203, the communication processing unit 4 to the CPU 204, the communication processing unit 5 to the CPU 205, and the communication processing unit 6 to the CPU 206, respectively. There is no limit on the number of CPUs in the present invention.

The command destination selection program 7 references the system structure file 110, the command information file 120 and the unified command information file 160 and identifies from among all the CPUs a CPU to which an input command 12, the console command entered from the keyboard, is to be sent. The contents of the input command 12 entered from the keyboard 130 are taken in by a keyboard input processing program 10. The input command consists of a command and an operand.

The message analysis program 8 analyzes a reply message for the command from each CPU and selects the CPU to which to send the console command. The command generation program 9 generates a command required to determine a final destination of the input command. A display processing program 11 displays the contents of the input command 12 in a command display field 142 on the display 140 and also displays reply messages for the input commands and ordinary console messages sent from the CPUs on a message display field 141.

Details of the above-noted programs will be described below.

FIG. 3 illustrates one example format of a system structure record 50 stored in the system structure file 110. The system structure record 50 includes a record ID 111 representing the ID of a record, a device name 112 storing the name of a device, a connected CPU 113 storing the name of a CPU to which the device specified by the device name 112 is connected, a device ID 114 to identify the device specified by the device name 112, an operation state 115 representing the operation state as seen from the connected CPU 113 of the device specified by the device ID 114, and a sending flag 116 representing the number of devices specified by the device ID 114 to which the command is to be sent.

The operation state 115 is "1" when a device specified by the device ID 114 is normally performing when viewed from the connected CPU 113 and, in the event of an anomaly, "0." The sending flag 116, when "0," demands that the command be delivered to only one of the CPUs connected with the device specified by the device ID 114 and, when "1," requires the command to be sent to all the CPUs connected with the device specified by the device ID 114. Reference numerals 50a, 50b, 50c, 50d, 50e, 50f, 50g, 50h, 50i, 50j, 50k and 50l represent system structure records for the system configuration of FIG. 1.

Referring to FIG. 1, a printer A 14 is a device connected to CPU-A 201. From the device name 112 of FIG. 3, it is seen that a record 50a represents the printer A 14. From the connected CPU 113 in the record 50a, it is understood that the CPU connected with the printer A 14 is a CPU-A 201. The operation state 115 shows that the printer A 14 is normally performing.

The device ID 114 in the record 50a is "0001," the same value as the device ID 114 of a record 501. This means that the record 501 also represents the printer A 14 as does the record 50a. Next, from FIG. 1, it is seen that a spool A 15 is a device connected to the CPU-A 201, CPU-B 202 and CPU-n 203.

The device name 112 of FIG. 3 shows that the records 50d, 50e, 50f represent a spool A 15. The connected CPU 113 indicates that the spool A 15 is connected to three CPUs, CPU-A 201, CPU-B 202 and CPU-n 203. The fact that the value of the sending flag 116 is "0" means that the command for the spool A 15 need only be sent to one of the three CPUs connected to the spool A 15.

Next, a disk 19 of FIG. 1 is represented by records 50j and 50k, as shown in the device name 112 of FIG. 3. The connected CPU 113 of FIG. 3 indicates that the disk 19 is connected to cpu-b 205 and cpu-n 206. Because the value of the sending flag 116 is "1," it is seen that the command needs to be transmitted to all the CPUs connected to the disk 19.

FIG. 4 shows one example format of a command information record 60 stored in the command information file 120. The command information record 60 includes a command 121 showing the contents of a command, an operand 122 storing the format of the operand of a command specified by the command 121, an operand ID 123 identifying an operand or wherein in the command the information on the command destination is located (in the case of a record 60b, for instance, although the operand 122 contains a job name and a printer name, the operand ID 123 contains a printer ID, so that the ID of the operand to select the destination is the printer name), a discriminating record ID 124 that stores a record ID 111 of the system structure file 110 used for selecting the destination of a command specified by the command 121 of FIG. 3, a command ID 125 identifying a command to be sent to CPUs to obtain their responses in order to determine the destination of a 'command' specified by the command 121 (that is, a search command for searching the destination of the command), a unified flag 126 that indicates whether the command in question is the one that unifies commands whose command formats differ among the central processing units but functions are equal, and message analyzing information 127 that stores information for selecting the destination of a next command by a reply message.

The unified flag 126 is set to "1" when a command specified by the command 121 is a unified command which unifies commands whose command description formats are different among the central processing units but functions are the same, and to "0" when it is not.

Reference numerals 60a, 60b, 60c, 60d, 60e represent examples of the command information record 60. From the command 121, it is seen that the record 60d, for instance, is a record for a command that calls for canceling of a job. It is also seen from the operand ID 123 that, of the operands specified by the operand 122, the operand that should be used for destination selection is "none."

The discriminating record ID 124 shows that the record ID 111 of the system structure record 50 used by the command of the record 60d is "2," meaning the records 50d, 50e, 50f, 50g, 50h, 50i are used. The command ID 125 of the record 60d shows that a command to be sent to CPUs to determine the destination of the 'command' specified by the command 121 is a "job search." It is seen that the record in the command information file 120 representing the "job search" is a record 60e. Because the unified flag 126 of the record 60d is "0," it is understood that the command specified by the record 60d is not a unified command.

Figures 5, 6:
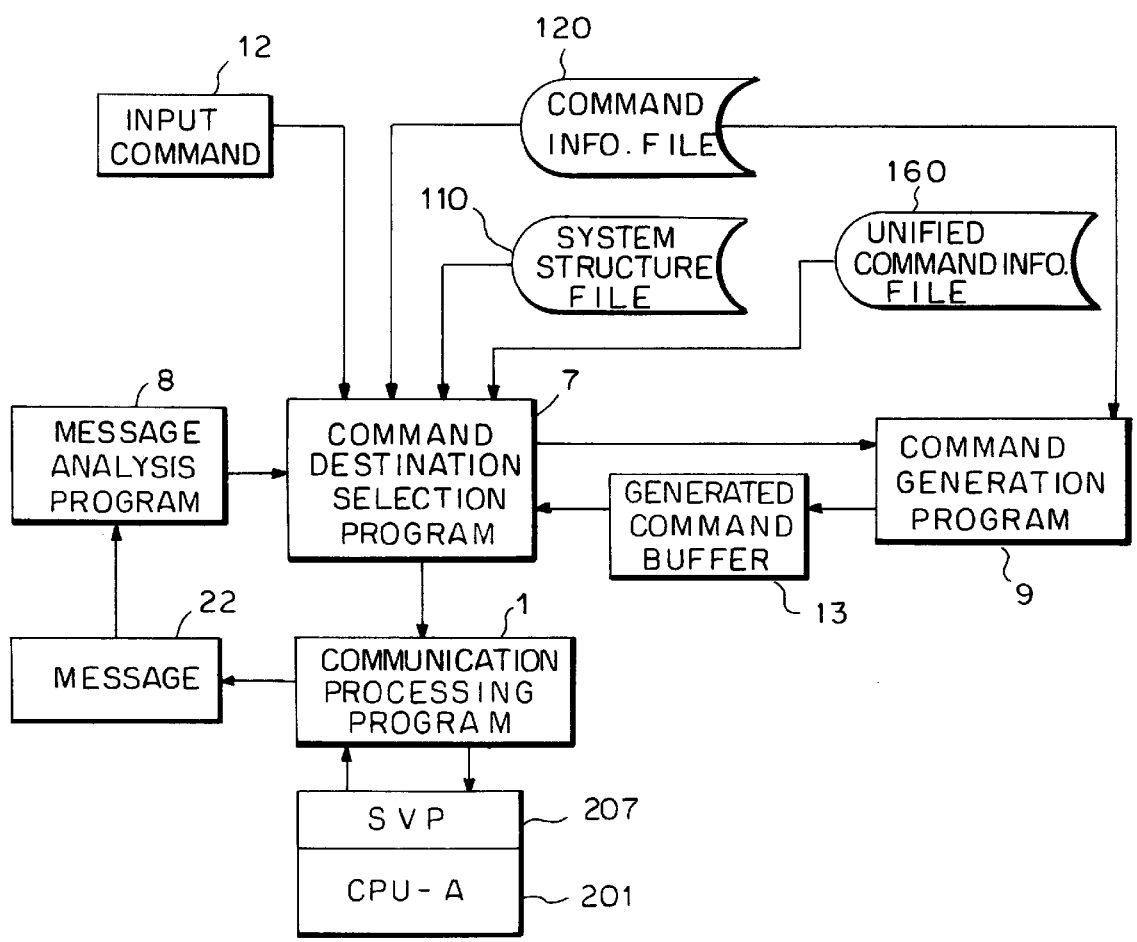
FIG. 5 illustrates an example format of a unified command information record stored in a unified command information file.
FIG. 6 is a flowchart illustrating the procedure for a command destination selection performed by the integrated console of FIG. 1.

FIG. 5 illustrates an example format of a unified command information record 161 stored in the unified command information file 160. The unified command information record 161 includes a unified command 162 representing the contents of a unified command, a CPU command 163 showing a command for the CPU having the same function as that of the unified command 162, and a responding CPU 164 showing the CPU that can execute the command specified by the CPU command 163.

Reference numerals 161a, 161b are examples of the unified command information record 161. The unified command 162 shows that the records 161a, 161b, for instance, are the ones for a disk on-line command. The CPU command 163 and the responding CPU 164 show that the disk on-line command is an "aaa" command for CPU-A 201 and a "bbb" command for CPU-B 202.

Now, by referring to FIG. 6, a procedure is explained for selection control of the command destination as performed by the integrated console of the present invention with the configuration shown in FIG. 1. Examples will be described below.

FIG. 6 illustrates the procedure for selecting the destination of a command entered from the keyboard 130 of FIG. 1. The command input means is not limited to a keyboard and may use other input means such as a mouse and a touch panel.

The command destination selection program 7, after receiving an input command 12, retrieves from the command information file 120 a command information record 60 that represents the input command 12.

(1) When a command is specified in the discriminating command 125 of the command information record 60, the command generation program 9 is executed to generate a command corresponding to the discriminating command 125.

The processing performed by the command generation program 9 involves retrieving from the command information file 120 a record that corresponds to the command specified by the discriminating command 125 of the command information record 60 picked up by the command destination selection program 7, picking up from the input command 12 an operand specified by the operand 122 of the retrieved record, generating a command from the operand that was picked up from the command 121 of the record and the input command 12, and storing the generated command in a generated command buffer 13.

Upon completion of the processing of the command generation program 9, the command destination selection program 7 retrieves a command information record 60 of the command information file 120 representing the command stored in the generated command buffer 13 and, when the retrieved record has a command ID 125, again executes the command generation program 9 to generate a destination selection command to be stored in the generated command buffer 13. When the command information record is 60e, for example, the command ID 125 of the record is "none" and therefore the command generation program 9 is not executed again.

(2) When no command is specified in the command ID 125 and no information is specified in the operand ID 123 of a command information record 60 corresponding to the received input command 12 or to the command stored in the generated command buffer 13, all the system structure records 50 whose record IDs 111 match the discriminating record ID 124 of the command information record 60 are picked up from the system structure file 110.

When the operand ID 123 of the command information record 60 has information, all the system structure records 50 whose device name's 112 match the information of operand ID 123 of the received input command 12 or the command stored in the generated command 13, are picked up from the retrieved system structure records 50.

When the number of retrieved system structure records 50 is one, the CPU in the connected CPU 113 of the retrieved record is taken to be the command destination. When the number of retrieved system structure records 50 is two or more and their sending flags are "1," the CPU in the connected CPU 113 of a record among the plurality of the retrieved records that has the operation state 115 of "1" is taken to be the command destination.

When the number of retrieved system structure records 50 is two or more and their sending flags are "0," a record is selected from the plurality of the received records, which has the operation state 115 of "1," and the CPU in the connected CPU 113 of the selected record is taken to be the command destination.

When the unified flag 126 in the command information record 60 representing the received input command 12 or the command in the generated command buffer 13 is "0," a command send request is sent to the communication processing unit that corresponds to the CPU previously selected as the command destination, to cause the communication processing unit to send the command to the corresponding CPU.

When the unified flag 126 in the command information record 60 representing the received input command 12 or the command in the generated command buffer 13 is "1," the processing procedure involves searching through the unified command information records associated with the command 121 specified by the command information record and picking up a unified command information record 161 in the unified command information file 160 that corresponds to the CPU previously selected as the command destination, executing the command generation program 9 to generate a CPU command 163 for the unified command information record 161 picked up from the unified command information file, sending a command send request to the communication processing unit that corresponds to the CPU previously selected as the command destination, and causing the communication processing unit to send the command generated by the command generation program 9 to the selected CPU.

FIG. 6 illustrates only the CPU-A 201 and the communication processing unit 1 corresponding to the CPU-A 201 for simplicity.

(3) Next, when in the case (1) the generated command buffer 13 has a command which is a discriminating command, the message analysis program 8 analyzes a reply message 22 that the communication processing unit received and then determines the destination of the command. The result of analysis is sent to the command destination selection program 7.

The command destination selection program 7 sends the following command send request to the communication processing unit that corresponds to the command destination received from the message analysis program 8. That is, when the command generation program 9 is executed only once, the request for sending the input command 12 is output to the communication processing unit. When the command generation program 9 is executed two or more times, the request for sending the command stored in the generated command buffer 13 is output. After all the send requests for the commands in the generated command buffer 13 have been processed, a request for sending the input command 12 is output.

Figure 8:
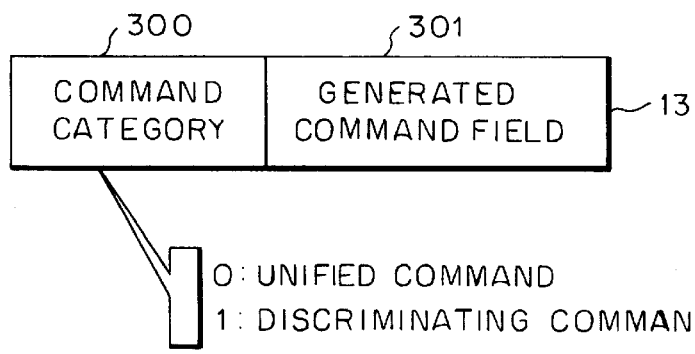
FIG. 8 illustrates an example structure of a generated command buffer.

FIG. 8 illustrates an example of the generated command buffer 13. The generated command buffer 13 includes a command category 300, which indicates whether the commands stored in the buffer have been generated by converting the unified command into specific commands for corresponding CPUs or they have been generated for a purpose of identifying the command destinations, and a generated command field 301 to store the generated commands.

When the command category 300 is "0," this indicates that the generated command in the generated command field 301 is a command generated by converting the unified command into specific commands for the corresponding CPUs. When it is "1," the command is the one generated to identify the command destination.

Figure 9:
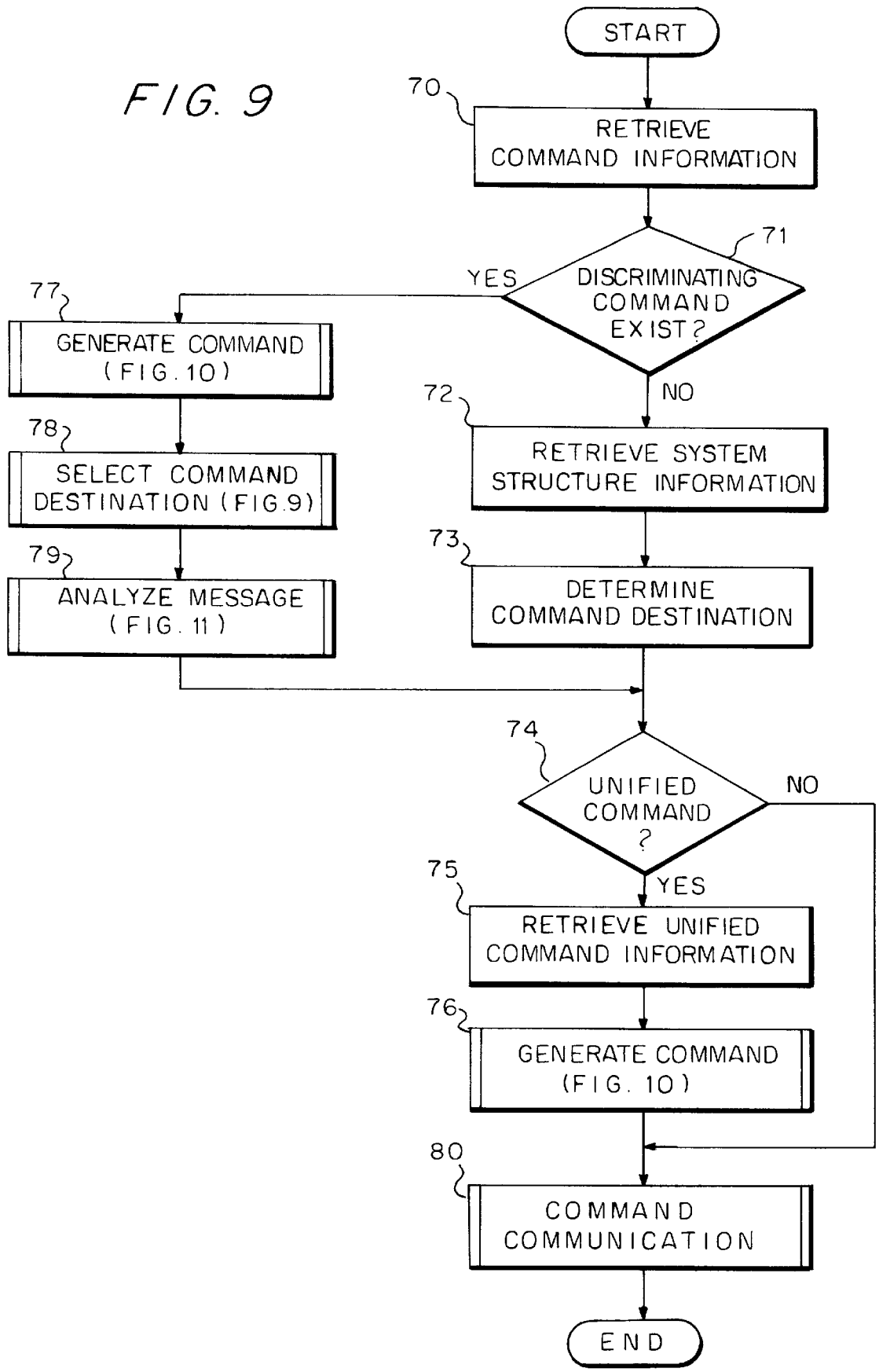
FIG. 9 is a flowchart illustrating a command destination selection program.

FIG. 9 is a processing flow of the command destination selection program 7 which selects the CPU to which the command entered from the keyboard 130 is to be sent. The command destination selection program 7 retrieves the command information record 60 for the destination selection command from the command information file 120 (step 70) and then checks if there is a command in the discriminating command 125 of the command information record 60 (step 71).

When the step 71 finds no command in the command ID 125, the program retrieves from the system structure file 110 all the system structure records 50 that have the record IDs 111 matching the contents of the discriminating record ID 124 of the command information record 60 retrieved in the step 70 (step 72).

When no operand ID 123 exists in the command information record 60, the CPU in the connected CPU 113 of the system structure record 50 obtained in the step 72 is taken to be the command destination.

When there is a operand ID 123 in the command information record 60 and when the device name of the system structure record 50 picked up by the step 72 exits at the position of the operand ID 123 in the command information record for the destination selection command, the CPU in the connected CPU 113 of the system structure record containing that device name is taken to be the command destination (step 73). Then, the program moves to step 74.

When the command ID 125 in the command information record 60 retrieved by the step 70 has a command, the processing procedure involves executing the command generation program 9 (step 77) described later to generate a command that corresponds to the command ID 125 in the command information record 60 picked up by the step 70, and then recursively executing the command destination selection program 7 on the generated command to select a CPU as the command destination that was generated by the command generation program 9 and stored in the generated command buffer 13 at step 77 (step 78).

Then, the message analysis program 8 described later analyzes a reply message to the generated command and determines the CPU to which the input command is to be sent (step 79). The program then moves to step 74.

After executing the step 73 and 79, the program checks the unified flag 126 of the command information record to decide whether the command is the one to select the destination or the unified command (step 74).

When the step 74 determines that the destination selection command is not a unified command, the program moves to step 80. When the destination selection command is a unified command, the program searches through the unified command information records associated with the command specified by the command information record and picks up a unified command information record 161 in the unified command information file 160 whose responding CPU 164 agrees with the command destination CPU determined by the steps 73 and 79 (processing 75).

The command generation program 9 is executed to generate a command for the CPU command 163 in the retrieved unified command information record (step 76). Finally, at step 80 the program sends a command send request to the communication processing unit 1, 2, 3, 4, 6 corresponding to the command destination CPU selected by steps 73 and 79 to cause the unit to send the command to the CPU, after which the command destination selection program 7 is ended.

Next, the processing procedure of the command generation program 9 executed by the command destination selection program 7 is explained by referring to FIG. 10. FIG. 10 is a processing flow of the command generation program 9.

The command generation program 9 retrieves from the command information file 120 a command information record 60 associated with a command to be generated (step 81). An operand specified by the operand 122 in the command information record 60 is picked up from the destination selection command by the reply message to a command being generated (step 82).

A generated command is generated based on the command 121 and operand 122 of the generated command information record and also on the operand retrieved by step 82. When the generated command is a command generated by converting the unified command into specific commands for corresponding CPUs, the command category 300 of the generated command buffer 13 is set with "0." When the generated command is a command for selecting the command destination, the command category 300 of the generated command buffer 13 is set with "1" and the generated command is stored in a generated command field 301 of the generated command buffer 13 (step 83) before ending the command generation program 9.

Next, by referring to FIG. 11, a description will be provided concerning the processing procedure of the message analysis program 8 for analyzing messages that the communication processing units 1, 2, 3, 4, 5, 6 have received from the corresponding CPUs. FIG. 11 is a processing flow of the message analysis program 8.

The message analysis program 8 checks the value of the command category 300 of the generated command buffer 13 to see if the message is a reply message to the discriminating command for selecting the command destination (step 91). If the step 91 has found that the reply message is not the reply message to the discriminating command, the message analysis program 8 in the configuration of FIG. 1 performs the display processing program 11 to display a message in the message display field 141 of the display 140. Then the message analysis program 8 is ended.

If at the step 91 the reply message is found to be the reply message for the generated command buffer 13, the program retrieves the contents of the message analyzing information 127 in the generated command buffer 13 (step 92) and checks whether the retrieved information is included in the reply message (step 93). When step 93 found that the message analyzing information is not included in the reply message, the program is ended. When at the step 93 the reply message is found to include message analyzing information the CPU that has sent the reply message is taken to be the destination (step 94), ending the message analysis program 8.

Next, by referring to FIGS. 1, 3, 4 and 9 to 11, the procedure for selecting a destination of a job cancel command will be described as an example of the command destination selection control of the integrated console of this invention.

With reference to FIG. 1, the job cancel command entered from the keyboard 130 is captured as an input command 12 by the keyboard input processing program 10. The display processing program 11 displays the contents of the input command 12 on the command display field 142 of the display 140. Next, the command destination selection program 7 selects a CPU as a destination of the input command 12.

With reference to FIG. 9, the command destination selection program 7 at step 70 retrieves a record 60d, the command information record 60 for the job cancel command, from the command information file 120. At step 71, the program references the discriminating command in the record 60d and, because the "job search" command is specified in the command ID 125, moves to step 77. Step 77 executes the command generation program 9 to generate the job search command, which is the command ID 125.

With reference to FIG. 10, the command generation program 9 at step 81 retrieves a record 60e, the command information record 60 representing the job search command in the discriminating command 125, from the command information file 120 and, at step 82, picks up a job name representing the operand ID 122 of the record 60e from the input command 12.

Then, at step 83, the program generates a command from the command 121 and operand 122 of the record 60e and from the operand picked up at step 82, and stores the generated command in the generated command field 301 of the generated command buffer 13. At the same time the program sets the value of the command category 300 of the generated command buffer 13 to "1."

Referring again to FIG. 9, the program at step 78 executes the command destination selection program 7 recursively on the generated command buffer 13 to select the destination of the command generated by the command generation program 9 at step 77.

Because the command indicated by the generated command buffer 13 is a job search command, the program picks up a record 60e from the command information file 120 at step 70 and, at step 71, references the discriminating command 125 in the record 60e. Because the record 60e has "none" in the discriminating command 125, the program moves to step 72. The step 72 picks up from the system structure file 110, system structure records 50 whose record IDs 111 are identical with the value "2" of the discriminating record ID 124 in the record 60e, that is, records 50d, 50e, 50f, 50g, 50h, 50i because the value of the operand ID 123 of the record 60e is "none".

Next, at step 73, because the device names 112 of the records 50d, 50e, 50f are all "spool A," the sending flags 116 are all "0" and the operation states 115 of the records 50d, 50e are "1," the CPU-A 201 specified by the connected CPU 113 in the record 50d is taken as a command destination.

The device names 112 of the records 50g, 50h, 50i are all "spool B," the sending flags 116 are all "0" and the operation states 115 of the records 50g, 50h, 50i are all "1," the cpu-a 204 specified by the connected CPU 113 of the record 50g is taken as a command destination.

Next, at step 74, the unified flag 126 of the record 60e is "0," so the program moves to step 80. The step 80 activates the communication processing units 1, 4 corresponding to CPU-A 201 and cpu-a 204 to send the job search command to the CPU-A 201 and cpu-a 204.

With the above steps taken, the processing of the command destination selection program 7 for the job search command—the command specified by the generated command buffer 13—is finished. Now, the step 78 of the command destination selection program 7 for the job cancel command is ended.

Next, step 79 executes the message analysis program 8 on each of the reply messages that the communication processing units 1, 4 have received, to analyze the reply messages to the job search command that were received by the communication processing units 1, 4.

Referring to FIG. 11, at step 91, the value of the command category 300 in the generated command buffer 13 is "1," so the program moves to step 92. The step 92 picks up from the generated command buffer 13 the "job name" in the message analyzing information 127 of the record 60e according to the operand 122. Next, step 93 checks whether the reply message includes the job name picked up at step 92. If the job name is included in the reply message, the program moves to step 94 where the CPU corresponding to the communication processing unit that has received the reply message is taken to be a destination of the job cancel command, i.e., the input command 12, which is to be sent next.

Now, turning again to FIG. 9, after the destination CPU for the job cancel command is selected at step 79, the program determines at step 74 that the unified flag 126 of the record 60d is "0" and therefore goes to step 80. The step 80 activates the communication processing unit corresponding to the CPU selected at step 79 to send the job cancel command. The communication processing unit that has sent the job cancel command now sends the reply message for the job cancel command to the message analysis program.

With reference to FIG. 11, because step 91 found no command in the generated command buffer 13, the program moves to step 95 where it executes the display processing program. Referring to FIG. 1, the display processing program 11 displays the reply message in the message display field 141 of the display 140. With the above steps taken, the processing on the job cancel command is completed.

If the command ID 125 has another command ID (hereinafter referred to as a second command ID) rather than "none," a command information record specifying the second command ID is retrieved from the command information file 120 and is subjected to the same processing that was performed on the above-mentioned record 60e to generate a second command based on the second command ID, to select the destination for the second command and to send the second command to the destination. The reply message returned from the destination is then analyzed by the message analysis program, according to the result of which the destination of the command generated according to the record 60e is selected.

Figure 2:
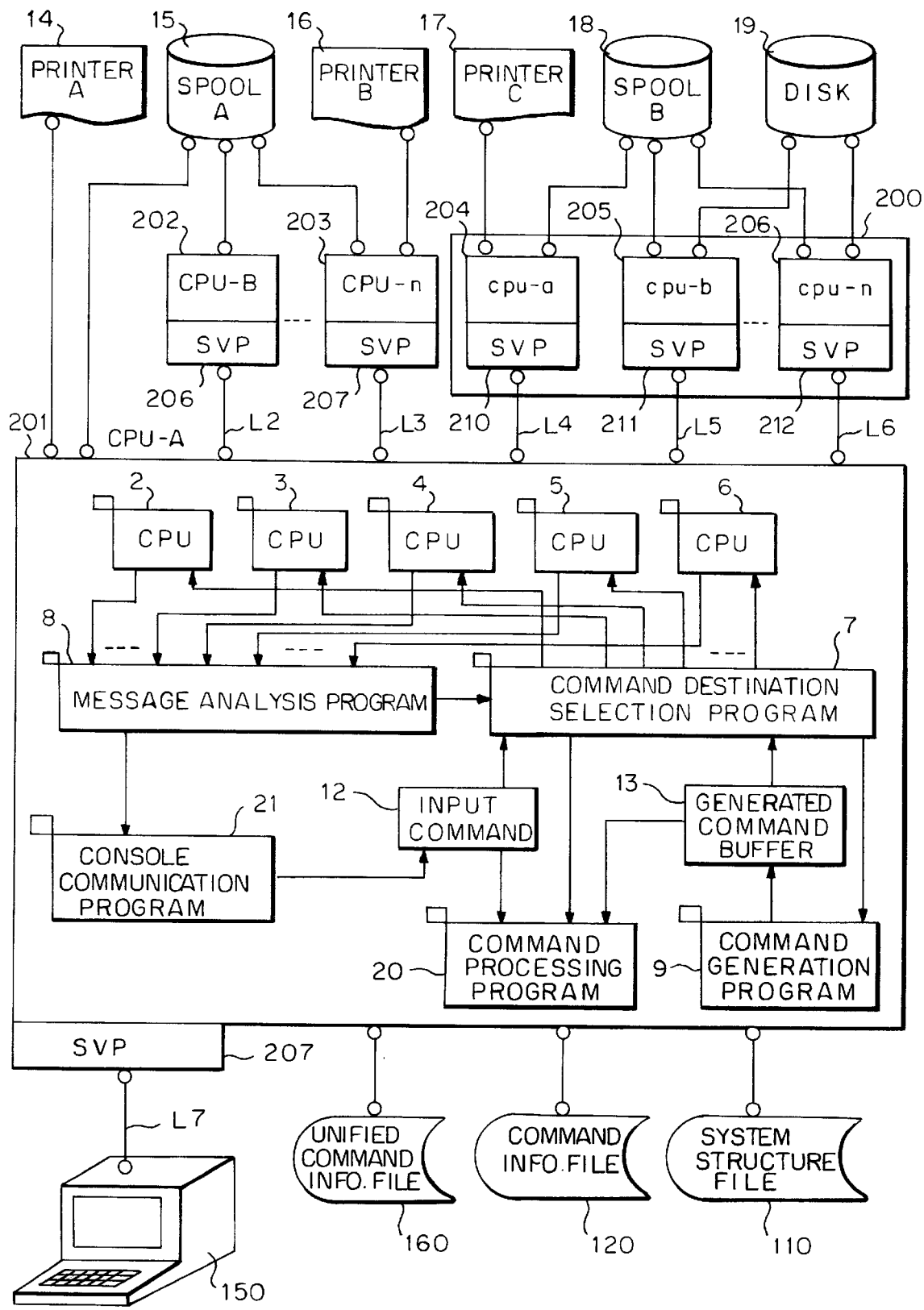
FIG. 2 is a block diagram illustrating the configuration of a computer system applying the integrated console as a second embodiment of the present invention.

Next, a second embodiment is described below. FIG. 2 shows a block diagram of the computer system configuration that applies the second embodiment of the integrated console according to this invention. FIG. 2 represents a case where the command destination selection control of the integrated console is not performed by a dedicated control unit using personal computer or workstation, but is performed by one of single central processing units CPU-A, CPU-B, . . . , CPU-n. In the case of FIG. 2, the CPU-A is used for such a purpose.

The second embodiment has many similarities to the first embodiment. Hence, in FIG. 2 the devices and programs having the same meanings as those of FIG. 1 are assigned identical reference numbers.

In FIG. 2, SVPs 208, 209, 210, 211, 212 are connected to CPU 201 through lines L2, L3, L4, L5, L6. The CPU 201 in FIG. 2, as with the control unit 100 of FIG. 1, is connected with a system structure file 110, a command information file 120 and a unified command information file 160. The SVP 207 of the CPU 201 is connected through line L7 with a keyboard/display device 150.

Information contained in the system structure file 110, the command information file 120 and the unified command information file 160 may be stored in files or in memory in the CPU 201. The CPU 201 is running the same programs as those shown in FIG. 1 that realize the command destination selection control of the integrated console of this invention (command destination selection program 7, message analysis program 8 and command generation program 9). The communication processing units 2, 3, 4, 5, 6 are programs that control communications of console messages and console commands to the SVPs 208, 209, 210, 211, 212 of the CPUs 202, 203, 204, 205, 206 through the lines L2, L3, L4, L5, L6.

In FIG. 1, the contents of the input command 12 entered from the keyboard 130 are stored in the keyboard input processing program 10, whereas in FIG. 2 the command entered from the keyboard/display device is received by and stored in a console communication program 21. In FIG. 2, a command processing program 20 performs processing as requested by the command sent to the CPU-A. The console communication program 21 controls communication of console messages and console commands to and from the keyboard/display device 150 through line L7.

The processing of the second embodiment is similar to that of the first embodiment that was explained by referring to FIGS. 6 and 9 to 11, except for the procedure for selecting a command destination.

Figure 7:
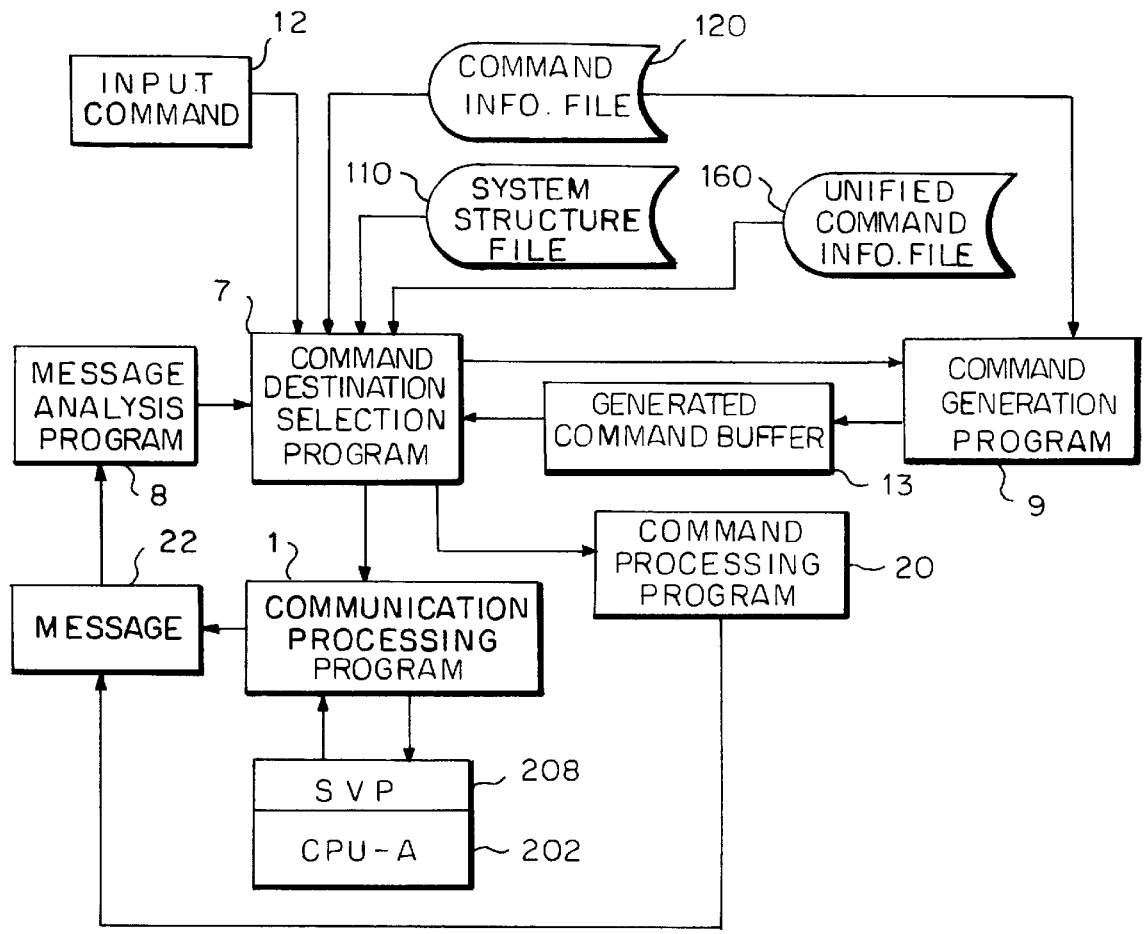
FIG. 7 is a diagram illustrating the processing procedure for a command destination selection performed by the integrated console of FIG. 2.

FIG. 7 shows the processing procedure for the command destination selection control of the integrated console with the configuration of the second embodiment (FIG. 2) of the present invention. FIG. 7 illustrates the procedure for selecting the destination of a command in the configuration of FIG. 2. The processing in FIG. 7 is similar to that of FIG. 6 up to the selection of the command destination.

If, as the result of selection of a command destination, the selected destination is a CPU that is running a processing program that realizes the command destination selection control of the integrated console of the present invention, the command destination selection program 7 sends a command processing request to the command processing program 20 in the same way as it would a send request to the communication processing unit. The command processing program 20 processes a command according to the request from the command destination selection program 7.

When the step 91 of FIG. 11 decides that the reply message is not the one for the command ID, the configuration of the first embodiment (FIG. 1) executes the display processing program 11 to display a message on the message-display field 141 of the display 140 whereas in the configuration of the second embodiment (FIG. 2) the console communication program 21 is executed to display a message on the keyboard/display device 150 (step 95) before ending the message analysis program 8.

Next, a third embodiment of the invention is described. FIG. 12 is a block diagram illustrating a computer system configuration that applies a console apparatus in a multi-window environment as a third embodiment of the present invention. The devices and programs having the same meanings as those of FIGS. 1 and 2 are given identical reference numbers.

In FIG. 12, physically one display 140 displays console windows 143, 144, 145, 146 corresponding to the consoles of CPUs and an integrated console window 147 corresponding to the screen of an integrated console of the present invention. A desired window for operation is selected by a mouse 131 and the selected window is informed to a keyboard input data distinction processing program 23 by a keyboard/mouse input processing program 22.

The keyboard input data distinction processing program 23 informs the selected window to the display processing program 11, which then displays the selected window on the display 140 so that it appears atop other windows. The command entered from the keyboard 130 is stored in the input command 12 by the keyboard/mouse input processing program 22, which also notifies the keyboard input data distinction processing program 23 that a command was entered.

The keyboard input data distinction processing program 23 sends a command display request to the display processing program 11 and at the same time, if the currently selected window is a window 143, 144, 145, 146 corresponding to the console of each CPU, sends a command send request to the communication processing unit for the CPU corresponding to the selected window. The keyboard input data distinction processing program 23, when the currently selected window is an integrated console screen, sends a command destination selection request to the command destination selection program 7.

The display processing program 11, upon receiving the command display request from the keyboard input data distinction processing program 23, displays a command on the window which is currently being displayed topmost. The communication processing units 1, 2, 3, 4, 5, 6, upon receiving a command send request from the keyboard input data distinction processing program 23, sends the contents of the input command 12 to the corresponding CPU and sends the reply messages for the command to the display processing program 11. The display processing program 11 displays the messages received from the communication processing units 1, 2, 3, 4, 5, 6 on the corresponding windows. Processing performed when the integrated console window 147 is selected is the same as in FIG. 1.

As can be seen from the above description, the present invention enables console operations on central processing units of a plurality of computer systems and on a plurality of central processing units of a superparallel computer to be performed by a single console apparatus. This in turn allows console operation whereby an operator do not need to be conscious of the system configuration, system operation state or central processing unit to which a command is to be sent. Because commands, which have the same functions but differ in format from one central processing unit to another, can be realized with a unified command throughout all the central processing units, a variety of advantages are produced, which include reduced labor in the operation on the central processing units of a plurality of computer systems and on a plurality of central processing units of a superparallel computer, reduced operator load, and improved reliability of system operation as realized by a reduced potential of erroneous operation on the part of the operator.

Further, the console operations on central processing units of a plurality of computer systems and on a plurality of central processing units of a superparallel computer can be performed as if an operator were operating a single system, simplifying the console operation.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An integrated console connected to a plurality of computer systems for sending a command entered from an input device to one of the computer systems which executes commands corresponding to the command from the input device and receiving signals that are output from the computer systems, said integrated console comprising:

a memory device which stores data used to select a destination of a command entered from the input device, system structure records of the computer systems and system structure records of devices connected to the computer systems, wherein said system structure records each includes a device name and a name of a central processing unit connected with a device specified by the device name, and a control unit which analyzes the command entered from the input device and sends the command entered from the input device to a selected one of the computer systems which executes commands corresponding to the command entered from the input device based on the data stored in the memory device, said control unit comprises:

selection means for selecting one of the computer systems based on the command input from the input device and the data stored in the memory device, and sending means for sending the command input from the input device to the computer system selected by the selection means, wherein, said control unit, when a command is entered from the input device and includes a device name, searches said memory device for a system structure record having the device name contained in the command and selects a destination of the command according to the contents of the system structure record.

2. An integrated console according to claim 1, wherein said system structure records each includes an operation state as seen from the central processing unit of a device specified by the device name, and wherein said control unit, when a command is entered from the input device and includes a device name, searches through said memory device for a system structure record having the device name contained in the command and, when the operation state in the searched system structure record is normal, sends the command and, when the operation state is abnormal, does not send the command.

3. An integrated console according to claim 1, wherein said system structure records each includes a send flag which represents either a case where the command can be executed by a plurality of central processing units and the same results can be obtained when the command is executed by any of the plurality of the central processing units or a case where the same results cannot be obtained, and wherein said control unit, when a command is entered from the input device and includes a device name and when the control unit searches through the memory device for a plurality of system structure records having the device name contained in the command and if the send flags in the plurality of the system structure records represent a case where the same results can be obtained, sends the command to one of the central processing units specified by the plurality of the system structure records and, if the send flags in the plurality of the system structure records represent a case where the same results cannot be obtained, sends the command to all of the central processing units specified by the plurality of the system structure records.

4. An integrated console according to claim 1, wherein said memory device further stores command information records that include commands for the central processing units and information necessary for sending the commands, and wherein, said control unit, when a command is entered from the input device, the control unit searches through the memory device for a command information record representing the command, searches through the memory device for one or more system structure records specified by the command information record, generates commands for individual devices specified by the one or more system structure records searched, and sends the generated commands to the central processing units connected to the devices specified by the system structure records.

5. An integrated console according to claim 4, wherein said control unit sends the generated command to a central processing unit connected to the devices specified by those of the system structure records searched that indicate the operation state is normal.

6. An integrated console according to claim 4, wherein said control unit, if the send flags in the searched system structure records represent a case where the same results can be obtained, sends the command to one of the central processing units specified by the system structure records and, if the send flags in the system structure records represent a case where the same results cannot be obtained, sends the command to all of the central processing units specified by the system structure records.

7. An integrated console according to claim 4, wherein the command information records each include a discriminating command for retrieving information used to select the destination of each command, and wherein said control unit, if a destination cannot be selected corresponding to an input command entered from the input device, extracts a command ID in the command information record searched from the memory device, searches through the memory device for a command information record corresponding to the extracted command ID, generates a command according to the searched command information record, sends the generated command to the central processing unit which is the destination of the generated command, and, according to the result of execution of the generated command by the central processing unit, selects the destination of the input command entered from the input device.

8. An integrated console according to claim 7, wherein when there are a plurality of central processing units that are the destinations of the generated command, the generated command is sent to the plurality of central processing units and, according to the results of all executions of the generated command, a destination of the input command entered from the input device is selected.

9. An integrated console according to claim 7, wherein said control unit, when there is a second command ID in the command information record corresponding to the extracted command ID searched from the memory device, extracts the second command ID, searches through the memory device for a second command information record corresponding to the extracted second command ID, generates a second command according to the searched second command information record, sends the generated second command to central processing units that are the destinations of the generated second command, and, according to the results of executions of the generated second command by these central processing units, selects the destination of the generated command.

10. An integrated console according to claim 4, wherein the memory device further stores unified command information records which unify into the same command those commands of different formats that realize the same function in the computer systems and the unified command information records each includes a unified command, a command in each central processing unit that realizes the function of the unified command and the name of each central processing unit, wherein said command information records each include a unified flag indicating whether the command in the record is a unified command or not, and wherein said control unit, when a command is entered from the input device and the unified flag in the command information record for the command indicates that the command is a unified command, searches through the memory device for the unified command information record representing the unified command, generates a command in the central processing units represented by the searched unified command information record, and sends the generated command to the central processing units.

11. An integrated console according to claim 1, wherein said control unit, when a command is entered from the input device and includes device names connected to a plurality of central processing units, searches through the memory device for all the system structure records having the device names contained in the command and takes as the destination of the command all the central processing units connected to the devices specified by these system structure records searched.

12. An integrated console according to claim 1, wherein said integrated console is provided by one of said computer systems.

13. An integrated console connected to a plurality of computer systems and/or a parallel computer, comprising:

an input/output device having a display and an input device operated by an operator;

a central processing unit connected to to the input/output device; and a memory device, connected to the central processing unit, storing data used to select a destination of a command entered from the input/output device and system structure records of the plurality of computer systems and/or the parallel computer and of devices connected to the plurality of computer systems and/or the parallel computer, the system structure records including names of the devices and names of central processing units connected to the devices specified by the device names;

wherein said integrated console sends a command entered from the input/output device to the central processing unit connected to the input/output device and to central processing units of the computer systems and/or central processing units in a superparallel computer that correspond to the command, and takes in signal lines output from the central processing unit connected to the input/output device, the central processing units of the computer systems and/or the individual central processing units in the superparallel computer;

wherein the central processing unit connected to the input/output device comprises selection means and command sending means, wherein said selection means analyzes the command entered from the input/output device according to data stored in the memory device and selects central processing units to execute the command from among the central processing unit connected to the input/output device, the central processing units of the computer systems and/or central processing units in the superparallel computer, wherein said command sending means sends the command to the central processing units selected by the selection means, and wherein said control unit, when a command is entered from the input device and includes a device name, searches through the memory device for a system structure record having the device name contained in the command, and, according to the contents of the system structure record, selects a destination of the command.

14. An integrated console according to claim 13, wherein the memory device stores, command information records including a command for the central processing units and information required for sending the command, and wherein said control unit, when a command is entered from the input device, searches through the memory device for a command information record representing the command, searches through the memory device for one or more system structure records specified by the command information record, generates commands for each of the devices specified by the one or more searched system structure records, and sends the generated commands to the central processing units connected to the devices specified by the system structure records.

15. An integrated console comprising:

a control unit;

a multi-window display to display a plurality of console screens; and an input device operated by an operator;

wherein said integrated console is connected to computer systems and/or a superparallel computer and, when a window for console screen is selected from the multi-windows by the input device and an input command is entered, the integrated console sends the input command to that central processing unit among the central processing units of the computer systems and/or the central processing units of the superparallel computer that correspond to the selected console screen, wherein a memory device is provided which stores data used to select a destination of the command entered from the input device and system structure records of the computer systems and/or the superparallel computer and of devices connected to the computer systems and/or the superparallel computer, and wherein said system structure records each includes device names of the devices and names of central processing units connected to the devices specified by the device names;

wherein said control unit is provided with an integrated console control unit which includes selection means, wherein said selection means analyzes a command entered from the input device according to the data stored in the memory device and selects the central processing units that should execute the command from among central processing units of the computer systems and central processing units in the superparallel computer;

wherein said control unit, when said input device selects ha a window for an integrated console screen and an input command is entered, sends the input command to the central processing units selected by the integrated console control unit, and, when a command is entered from the input device and includes a device name, searches through the memory device for system structure records having the device name contained in the command and, according to the contents of the system structure records, selects central processing units which are destinations of the command.

16. An integrated console according to claim 15, wherein the memory device stores command information records including a command for the central processing units and information required for sending the command, and wherein said control unit, when a command is entered from the input device searches through the memory device for a command information record representing the command, searches through the memory device for one or more system structure records specified by the command information record, generates commands for each of the devices specified by the one or more searched system structure records, and sends the generated commands to the central processing units connected to the devices specified by the system structure records.

17. An integrated console comprising:

a control unit;

a display;

an input device operated by an operator; and a memory device in which to store data used to select destination of a command entered from the input device, system structure records of the computer systems and/or said superparallel computer, and system structure records of devices connected to the computer systems and/or said superparallel computer, wherein said system structure records each includes a device name and a name of a central processing unit connected with a device specified by the device name, wherein the integrated console is connected to computer systems and/or a superparallel computer, sends a command entered from the input device to central processing units of the computer systems and/or central processing units in the superparallel computer corresponding to the command, and takes in signal lines that are output from the central processing units of the plurality of computer systems and/or the individual central processing units in the superparallel computer;

wherein said control unit analyzes the command entered from the input device according to the data stored in the memory device, and includes selection means and sending means, wherein said the selection means selects a central processing unit that should execute the command from among the central processing units of the plurality of the computer systems and/or the plurality of central processing units in the superparallel computer, wherein said sending means sends the command to the selected central processing unit selected by the selection means, and wherein, said control unit, when a command is entered from the input device and includes a device name, searches said memory device for a system structure record having the device name contained in the command and selects a destination of the command according to the contents of the system structure record.

18. An integrated console according to claim 17, wherein said system structure records each includes an operation state as seen from the central processing unit of a device specified by the device name, and wherein said control unit, when a command is entered from the input device and includes a device name, searches through said memory device for a system structure record having the device name contained in the command and, when the operation state in the searched system structure record is normal, sends the command and, when the operation state is abnormal, does not send the command.

19. An integrated console according to claim 17, wherein said system structure records each includes a send flag which represents either a case where the command can be executed by a plurality of central processing units and the same results can be obtained when the command is executed by any of the plurality of the central processing units or a case where the same results cannot be obtained, and wherein said control unit, when a command is entered from the input device and includes a device name and when the control unit searches through the memory device for a plurality of system structure records having the device name contained in the command and if the send flags in the plurality of the system structure records represent a case where the same results can be obtained, sends the command to one of the central processing units specified by the plurality of the system structure records and, if the send flags in the plurality of the system structure records represent a case where the same results cannot be obtained, sends the command to all of the central processing units specified by the plurality of the system structure records.

20. An integrated console according to claim 17, wherein said memory device further stores command information records that include commands for the central processing units and information necessary for sending the commands, and wherein, said control unit, when a command is entered from the input device, the control unit searches through the memory device for a command information record representing the command, searches through the memory device for one or more system structure records specified by the command information record, generates commands for individual devices specified by the one or more system structure records searched, and sends the generated commands to the central processing units connected to the devices specified by the system structure records.

21. An integrated console according to claim 20, wherein said control unit sends the generated command to a central processing unit connected to the devices specified by those of the system structure records searched that indicate the operation state is normal.

22. An integrated console according to claim 20, wherein said control unit, if the send flags in the searched system structure records represent a case where the same results can be obtained, sends the command to one of the central processing units specified by the system structure records and, if the send flags in the system structure records represent a case where the same results cannot be obtained, sends the command to all of the central processing units specified by the system structure records.

23. An integrated console according to claim 20, wherein the command information records each include a discriminating command for retrieving information used to select the destination of each command, and
wherein said control unit, if a destination cannot be selected corresponding to an input command entered from the input device, extracts a command ID in the command information record searched from the memory device, searches through the memory device for a command information record corresponding to the extracted command ID, generates a command according to the searched command information record, sends the generated command to the central processing unit which is the destination of the generated command, and, according to the result of execution of the generated command by the central processing unit, selects the destination of the input command entered from the input device.

24. An integrated console according to claim 23, wherein when there are a plurality of central processing units that are the destinations of the generated command, the generated command is sent to the plurality of central processing units and, according to the results of all executions of the generated command, a destination of the input command entered from the input device is selected.

25. An integrated console according to claim 23, wherein said control unit, when there is a second command ID in the command information record corresponding to the extracted command ID searched from the memory device, extracts the second command ID, searches through the memory device for a second command information record corresponding to the extracted second command ID, generates a second command according to the searched second command information record, sends the generated second command to central processing units that are the destinations of the generated second command, and, according to the results of executions of the generated second command by these central processing units, selects the destination of the generated command.

26. An integrated console according to claim 20, wherein the memory device further stores unified command information records which unify into the same command those commands of different formats that realize the same function in the computer systems and in the plurality of central processing units of the superparallel computer, and the unified command information records each includes a unified command, a command in each central processing unit that realizes the function of the unified command and the name of each central processing unit,
wherein said command information records each include a unified flag indicating whether the command in the record is a unified command or not, and
wherein said control unit, when a command is entered from the input device and the unified flag in the command information record for the command indicates that the command is a unified command, searches through the memory device for the unified command information record representing the unified command, generates a command in the central processing units represented by the searched unified command information record, and sends the generated command to the central processing units.

27. An integrated console according to claim 17, wherein said control unit, when a command is entered from the input device and includes device names connected to a plurality of central processing units, searches through the memory device for all the system structure records having the device names contained in the command and takes as the destination of the command all the central processing units connected to the devices specified by these system structure records searched.

28. A method to be performed by a user in an integrated console connected to a plurality of computer systems for sending a command entered from an input device when manipulated by the user to one of the computer systems which executes commands corresponding to the command from the input device and receiving signals that are output from the computer systems, said method comprising the steps of:
inputting a command from entered by manipulation of the input device by said user;
analyzing the command entered from the input device;
sending the command entered from the input device being manipulated by the user to a selected one of the computer systems which executes commands corresponding to the command based on data stored in a memory device, said memory device storing data used to select a destination of a command entered from the input device, system structure records of the computer systems and system structure records of devices connected to the computer systems, wherein said system structure records each includes a device name and a name of a central processing unit connected with a device specified by the device name;
when a command is entered from the input device and includes a device name, searching said memory device for a system structure record having the device name contained in the command; and
selecting a destination of the command according to the contents of the system structure record.

29. A method according to claim 28, wherein said system structure records each includes an operation state as seen from the central processing unit of a device specified by the device name, and
wherein said method further comprises the steps of:
when a command is entered from the input device and includes a device name, searching through said memory device for a system structure record having the device name contained in the command; and
when the operation state in the searched system structure record is normal, sending the command and, when the operation state is abnormal, not sending the command.

30. A method according to claim 28 wherein said system structure records each includes a send flag which represents either a case where the command can be executed by a plurality of central processing units and the same results can be obtained when the command is executed by any of the plurality of the central processing units or a case where the same results cannot be obtained, and wherein said method further comprises the steps of:
when a command is entered from the input device and includes a device name and when the control unit searches through the memory device for a plurality of system structure records having the device name contained in the command and if the send flags in the plurality of the system structure records represent a case where the same results can be obtained, sending the command to one of the central processing units specified by the plurality of the system structure records, and if the send flags in the plurality of the system structure records represent a case where the same results cannot be obtained, sending the command to all of the central processing units specified by the plurality of the system structure records.

31. A method according to claim 28, wherein said memory device further stores command information records that include commands for the central processing units and information necessary for sending the commands, and
wherein, method further comprises the steps of:
when a command is entered from the input device, the control unit searching through the memory device for a command information record representing the command;

searching through the memory device for one or more system structure records specified by the command information record;

generating commands for individual devices specified by the one or more system structure records searched; and sending the generated commands to the central processing units connected to the devices specified by the system structure records.

32. A method according to claim 31, further comprising the steps of:
sending the generated command to a central processing unit connected to the devices specified by those of the system structure records searched that indicate the operation state is normal.

33. A method according to claim 31 further comprising the steps of:
if the send flags in the searched system structure records represent a case where the same results can be obtained, sending the command to one of the central processing units specified by the system structure records, and if the send flags in the system structure records represent a case where the same results cannot be obtained, sending the command to all of the central processing units specified by the system structure records.

34. A method according to claim 31, wherein the command information records each include a discriminating command for retrieving information used to select the destination of each command, and
wherein said method further comprises the steps of:
if a destination cannot be selected corresponding to an input command entered from the input device, extracting a command ID in the command information record searched from the memory device;

searching through the memory device for a command information record corresponding to the extracted command ID, generating a command according to the searched command information record;

sending the generated command to the central processing unit which is the destination of the generated command; and according to the result of execution of the generated command by the central processing unit, selecting the destination of the input command entered from the input device.

35. A method according to claim 34, wherein when there are a plurality of central processing units that are the destinations of the generated command,
wherein said method further comprises the steps of:
sending the generated command to the plurality of central processing units, and selecting, according to the results of all executions of the generated command, a destination of the input command entered from the input device.

36. A method according to claim 34 further comprising the steps of:
when there is a second command ID in the command information record corresponding to the extracted command ID searched from the memory device, extracting the second command ID, searching through the memory device for a second command information record corresponding to the extracted second command ID, generating a second command according to the searched second command information record, sending the generated second command to central processing units that are the destinations of the generated second command; and selecting, according to the results of executions of the generated second command by these central processing units, the destination of the generated command.

37. A method according to claim 31, wherein the memory device further stores unified command information records which unify into the same command those commands of different formats that realize the same function in the computer systems and the unified command information records each includes a unified command, a command in each central processing unit that realizes the function of the unified command and the name of each central processing unit,
wherein said command information records each include a unified flag indicating whether the command in the record is a unified command or not, and
wherein said method further comprises the steps of:
when a command is entered from the input device and the unified flag in the command information record for the command indicates that the command is a unified command, searching through the memory device for the unified command information record representing the unified command;

generating a command in the central processing units represented by the searched unified command information record; and sending the generated command to the central processing units.

38. A method according to claim 28 further comprising the steps of:
when a command is entered from the input device and includes device names connected to a plurality of central processing units, searching through the memory device for all the system structure records having the device names contained in the command; and taking as the destination of the command all the central processing units connected to the devices specified by these system structure records searched.

* * * * *